United States Patent [19]

Seth

[11] 4,395,389
[45] Jul. 26, 1983

[54] CHLOROSILANE DISPROPORTIONATION PROCESS

[75] Inventor: Kishankumar K. Seth, Baton Rouge, La.

[73] Assignee: Ethyl Corporation, Richmond, Va.

[21] Appl. No.: 353,491

[22] Filed: Mar. 1, 1982

[51] Int. Cl.³ .................... C01B 33/04; C01B 33/107
[52] U.S. Cl. .................................. 423/341; 423/342; 423/347
[58] Field of Search ................. 423/341, 342, 347

[56] References Cited

U.S. PATENT DOCUMENTS

| | | | |
|---|---|---|---|
| 2,627,451 | 2/1953 | Erickson et al. | 23/14 |
| 2,732,280 | 1/1956 | Bailey et al. | 23/14 |
| 2,834,648 | 5/1958 | Bailey et al. | 23/14 |
| 3,044,845 | 7/1962 | Jex et al. | 23/14 |
| 3,322,511 | 5/1967 | Weyenberg | 23/366 |
| 3,445,200 | 5/1969 | Dunogues et al. | 23/366 |
| 3,627,501 | 12/1971 | Kruger | 23/366 |
| 3,928,542 | 12/1975 | Bakay | 423/342 |
| 3,968,199 | 7/1976 | Bakay | 423/347 |
| 4,018,871 | 4/1977 | Marin et al. | 423/342 |
| 4,038,371 | 7/1977 | Marin | 423/342 |
| 4,113,845 | 9/1978 | Litteral | 423/342 |

*Primary Examiner*—Jack Cooper
*Attorney, Agent, or Firm*—Donald L. Johnson; Joseph D. Odenweller; John F. Hunt

[57] ABSTRACT

Polyvinyl cyclic tertiary amine hydrocarbons having nitrogen in the ring as catalysts for chlorosilane disproportionation. The catalysts are suitable for continuous flow processes redistributing any one or more of $SiHCl_3$, $SiH_2Cl_2$, and $SiH_3Cl$.

14 Claims, No Drawings

CHLOROSILANE DISPROPORTIONATION PROCESS

BACKGROUND OF THE INVENTION

I. Field of the Invention

This invention relates in general to redistribution reactions and in particular to a process for the disproportionation or redistribution of chlorosilane.

II. Description of the Prior Art

Numerous methods and catalyst materials are known for the disproportionation of chlorosilane. For example, Union Carbide's U.S. Pat. No. 2,834,648 to Bailey et al discloses the use of various secondary and tertiary aliphatic amines, their salts and derivatives and certain heterocyclic amines. Bailey et al disclose a process for heating a chlorosilane having at least one hydrogen atom to about 150°–200° C. in an autoclave in the presence of, for example, cetyldimethylamine, trimethylamine hydrochloride, or pyridine. Various other types of catalysts for the chlorosilane disproportionation reaction have been proposed in batch reaction processes.

U.S. Pat. No. 3,627,501 to Kruger discloses the use of certain catalysts in a bed through which trichlorosilane ($SiHCl_3$) is passed and disproportionated to dichlorosilane ($SiH_2Cl_2$) and silicon tetrachloride ($SiCl_4$). The process of Kruger is conducted at about 150°–250° C. or higher with about a 5–10 mole percent conversion to $SiH_2Cl_2$.

Union Carbide's U.S. Pat. No. 3,044,845 to Jex et al discloses the use of various pyridines in combination with a halohydrocarbon promoter so that the process may be carried out at less than 100° C.

U.S. Pat. No. 4,113,845 to Litteral discloses a continuous process for disproportionation of chlorosilanes using a copolymer-based resin in a fixed bed.

SUMMARY OF THE INVENTION

The present invention is a process for redistributing one or more of trichlorosilane, dichlorosilane, and monochlorosilane, the process comprising the steps of:

(a) passing such chlorosilane over a catalyst bed of polyvinyl cyclic, tertiary amine hydrocarbons having nitrogen in the ring for a period of time sufficient to produce a silane containing less chlorine than is contained in the chlorosilane fed to the catalyst bed and a silane containing more chlorine than is contained in the chlorosilane fed to the catalyst bed; and (b) separately recovering the silanes produced by redistribution.

The present invention is also an improvement in a process for the preparation of $SiH_2Cl_2$ by treating $SiHCl_3$ in the presence of a catalyst wherein the improvement comprises using a polyvinyl cyclic tertiary amine hydrocarbon having nitrogen in the ring as the catalyst.

The following equations represent the disproportionation reactions which are in thermal dynamic equilibria during the process of the invention:

$$2SiHCl_3 \rightleftharpoons SiH_2Cl_2 + SiCl_4 \qquad \text{I}$$

$$2SiH_2Cl_2 \rightleftharpoons SiHCl_3 + SiH_3Cl \qquad \text{II}$$

$$2SiH_3Cl \rightleftharpoons SiH_2Cl_2 + SiH_4 \qquad \text{III}$$

Since the disproportionation reactions are in thermal dynamic equilibria, the products of such reactions are present in the reaction mixture or effluent in amounts determined by the equilibrium constants for the reaction. Disproportionation of the reactants as set forth above is commercially important for production of feedstocks in the deposition of semiconductor grade polysilicon, namely dichlorosilane and silane. Of course, the feedstocks may be used for other applications including the direct production of monocrystalline silicon when used in a process where direct conversion is possible.

The present invention is especially advantageous in that the polymeric polyvinyl tertiary amine hydrocarbon is suitable for use in a fixed bed process whereas chemicals like vinylpyrrolidone or vinylpyridine are unsuitable because they are liquid. Other chemicals are unsuitable because of their solubility in the reactant and higher vapor pressures which will cause contamination of the product.

The relative amount of catalyst used in this invention is not narrowly critical, but the catalyst bed may have to be replaced after a given volume of reactant has passed therethrough. The process may be carried out under subatmospheric, atmospheric, or superatmospheric pressure so long as the reactant is controlled so that it has a residence time in the vicinity of the catalyst sufficient for disproportionation. The residence or contact time between reactant and catalyst bed is variable with the operating time and pressure used. The process may be optimized for a given operating temperature and reactant so as to closely approach the highest product formation allowed by the equilibrium.

Materials of construction for the continuous redistribution reactor include stainless steel and similar materials of sufficient strength and inert character for the given reactor and operating pressure. Similarly, a pressurized feed container may be used to supply reactant, for example, $SiHCl_3$, to the continuous flow reactor. Of course, glassware may be used for the process of the invention, but this is normally unsuitable for large-scale production.

The polyvinyl cyclic tertiary amines of the invention are a polymer formed by conventional means. The polymers of the invention include polyvinylpyrrolidone, polyvinylpyrrolidine, polyvinylpyridine, and substituted analogs thereof where the substituent groups do not interfere with catalyst activity. The tertiary amines of the invention are preferably poly-N-vinyl compounds of the type described above or polyvinylpyridine. The catalysts are essentially homopolymers, but may be somewhat cross-linked by contaminants or various other techniques, though they are not true copolymers such as those formed from two polymerizable reactants.

Examples of substituted analogs include alkyl substituted polyvinylpyrrolidines such as

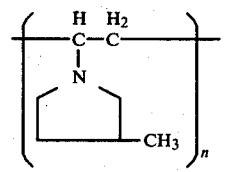

where n is large.

The preferred catalysts of the invention are polymerized from the following chemicals:

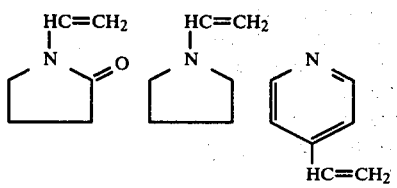

The polymers offer advantages over other various nitrogen-containing catalysts of the prior art. The advantages include the suitability of the polymer for use in a large-scale catalyst bed in a manner which provides a large number of catalyst sites per unit volume while generating a pressure drop in the reactor which is at an acceptable level. Also, the polyvinyl cyclic catalysts of the invention are more economical than certain other materials proposed and used in disproportionation reactions.

The effluent products of the disproportionation reaction may be separated by conventional means such as a distillation column. For example, where $SiHCl_3$ is the reactant, the recovery of $SiCl_4$ and $SiH_2Cl_2$ is sought. The $SiH_2Cl_2$ may be recovered as the lighter boiling component for use in a silicon disposition process and the $SiCl_4$ may be recovered as the bottom product for recycle to a hydrogenation unit or other process. Notably, $SiCl_4$ is an article of commerce having numerous uses.

The nature of the process is usually determined by the character of the reactant and the operating temperature. For example, where $SiHCl_3$ is disproportionated at a temperature below its boiling point, the process will be basically a liquid phase reaction. It may be necessary to use several steps or distillation columns to effectively separate the unreacted feed and each of the products of disproportionation.

DESCRIPTION OF THE PREFERRED EMBODIMENTS

While the catalyst polyvinyl cyclic polymer of the invention is most advantageously used in a continuous process with recycle of the unreacted chlorosilane feed, it is also possible to use the catalyst in a discontinuous process where the catalyst and reactant are held at a suitable reaction temperature for a time effective to disproportionate the feed chlorosilane. Of course, it is then necessary to separate the unreacted feed, disproportionation products, and solid polymer catalyst, none of the chlorosilanes or $SiH_4$ being in solid form at ambient temperature.

The polymer catalyst polyvinyl cyclic tertiary amines most advantageously have a particle size of about 50–500 microns thereby providing an optimum number of absorption sites and a suitable void volume. Note that other catalysts used in the prior art are not only soluble in the feed chlorosilane, but they are liquids and cannot be used in a continuous process without complex liquid separation problems.

The following example does not limit the invention but illustrates the disproportionation of a chlorosilane in accordance with the invention.

EXAMPLE

A stainless steel $\frac{1}{4}'' \times 5'$ column was packed with polyvinylpyrrolidone of particle size about 150 microns diameter on the average. The polymer was of very high molecular weight and about 50% void volume. The cross-sectional area of the column was about 0.164 square centimeters. The polymer was Catalog Number 85,648.7, from Aldrich Chemical Company. A gas chromatography unit was attached in line to sample the composition of effluent from the column. Trichlorosilane, $SiHCl_3$, under pressure was fed to the column and a flow rate through the packed bed was stabilized at about 0.5 feet/minute thereby providing a ten-minute residence period. It is believed that the ten-minute residence time was greater than the time required for equilibrium production of dichlorosilane ($SiH_2Cl_2$) at the operating parameters of this experiment, but ten minutes was used to assure good disproportionation. The mass flow rate to about 1.5 grams (0.011 mole) per minute. Both the column and feed ($SiHCl_3$) were kept at about 70° C. and the process was carried out for about one hour. Gas chromatography analysis samples were taken after 8, 20, 32, and 41 minutes with consistent results as indicated:

TABLE

| | |
|---|---|
| $SiH_2Cl_2$ | 11.8 wt. % |
| $SiHCl_3$ (to recycle) | 76.0 wt. % |
| $SiCl_4$ | 13.2 wt. % |

In operation the effluent is preferably directed to successive distillations for separate recovery of $SiH_2Cl_2$, $SiHCl_3$, and $SiCl_4$. Of course, any of the chlorosilanes or mixtures thereof could be effectively used as feed to the packed bed to obtain various desired disproportionation effluents.

Although I have shown a preferred embodiment of my invention, it is possible to vary certain aspects thereof such as reactor size, feed stream, flow rate, etc. without departing from the scope or spirit of the invention as defined by the following claims.

I claim:

1. A process for the redistribution of one or more of trichlorosilane, dichlorosilane, and monochlorosilane, said process comprising the steps of:
   (a) passing such chlorosilane over a catalyst bed of polyvinyl cyclic, tertiary amine hydrocarbons having nitrogen in the ring, said hydrocarbons being selected from polyvinylpyrrolidone, polyvinylpyrrolidine, polyvinylpyridine, and substituted analogs thereof where the substituent groups do not interfere with catalyst activity and which are essentially homopolymers, for a period of time sufficient to produce a silane containing less chorine than is contained in the chlorosilane fed to the catalyst bed and a silane containing more chlorine than is contained in the chlorosilane fed to the catalyst bed; and
   (b) separately recovering the silanes produced by redistribution.

2. The process of claim 1 wherein such chlorosilane is preheated to about 50°–150° C. before passing over the catalyst bed.

3. The process of claim 1 wherein the catalyst bed is kept at about 50°–100° C. for redistribution of such chlorosilane.

4. The process of claim 1 wherein unredistributed chlorosilane is recycled to the catalyst bed and the process is carried out in a continuous manner.

5. The process of claim 1 wherein trichlorosilane is fed, and dichlorosilane and silicon tetrachloride are recovered.

6. The process of claim 1 wherein a disproportionation product is silane, $SiH_4$.

7. The process of claim 6 wherein said process is carried out at about 50°–150° C.

8. The process of claim 1 wherein a disproportionation product is silicon tetrachloride, $SiCl_4$.

9. The process of claim 1 wherein the disproportionation is carried out at about 70° C.

10. The process of claim 1 wherein said catalyst is selected from the high molecular weight polymers polyvinylpyrrolidone, polyvinylpyrrolidine, and polyvinylpyridine.

11. The process of claim 10 wherein said catalyst is polyvinylpyrrolidone.

12. In a process for the preparation of dichlorosilane by treating trichlorosilane in the presence of a catalyst, the improvement wherein a polyvinyl cyclic tertiary amine hydrocarbon having nitrogen in the ring is used as the catalyst, said hydrocarbon being selected from polyvinylpyrrolidone, polyvinylpyrrolidine, polyvinylpyridine, and substituted analogs thereof where the substituent groups do not interfere with catalyst activity and which are essentially homopolymers.

13. The process of claim 12 wherein said catalyst is selected from the high molecular weight polymers polyvinylpyrrolidone, polyvinylpyrrolidine, and polyvinylpyridine.

14. The process of claim 13 wherein said catalyst is polyvinylpyrrolidone.

* * * * *

UNITED STATES PATENT AND TRADEMARK OFFICE
CERTIFICATE OF CORRECTION

PATENT NO. : 4,395,389
DATED : July 26, 1983
INVENTOR(S) : Kishankumar K. Seth

It is certified that error appears in the above—identified patent and that said Letters Patent is hereby corrected as shown below:

Column 3, line 11, should read -- N-vinylpyrrolidone --,
-- N-vinylpyrrolidine --, -- 4-vinylpyridine --.

Signed and Sealed this

Twenty-ninth Day of November 1983

[SEAL]

Attest:

GERALD J. MOSSINGHOFF

Attesting Officer   Commissioner of Patents and Trademarks